(12) United States Patent
Kusuda et al.

(10) Patent No.: US 6,867,409 B2
(45) Date of Patent: Mar. 15, 2005

(54) SOLID-STATE IMAGE SENSING DEVICE

(75) Inventors: Masayuki Kusuda, Nishinomiya (JP); Tomokazu Kakumoto, Nagaokakyo (JP)

(73) Assignee: Minolta Co., Ltd., Osaka (JP)

(*) Notice: Subject to any disclaimer, the term of this patent is extended or adjusted under 35 U.S.C. 154(b) by 236 days.

(21) Appl. No.: 10/302,300

(22) Filed: Nov. 22, 2002

(65) Prior Publication Data

US 2003/0098406 A1 May 29, 2003

(30) Foreign Application Priority Data

Nov. 28, 2001 (JP) ........................................ 2001-362420

(51) Int. Cl.[7] .......................... H01L 27/00; H04N 5/228
(52) U.S. Cl. ................................ 250/208.1; 348/222.1; 348/302
(58) Field of Search .......................... 250/208.1, 214.1, 250/214 C; 348/222.1, 244, 223.1, 294, 302

(56) References Cited

U.S. PATENT DOCUMENTS

| 5,241,575 | A | | 8/1993 | Miyatake et al. ............. 377/60 |
|---|---|---|---|---|
| 5,289,286 | A | * | 2/1994 | Nakamura et al. ......... 348/223.1 |
| 6,770,861 | B2 | * | 8/2004 | Hagihara .................. 250/208.1 |
| 2001/0010548 | A1 | * | 8/2001 | Kamumoto et al. ......... 348/229 |
| 2001/0032921 | A1 | * | 10/2001 | Forsberg .................. 250/214.1 |
| 2002/0000509 | A1 | * | 1/2002 | Hagihara .................. 250/208.1 |

FOREIGN PATENT DOCUMENTS

JP         2001-094878 A       4/2001

* cited by examiner

*Primary Examiner*—Stephone B. Allen
(74) *Attorney, Agent, or Firm*—Sidley Austin Brown & Wood LLP

(57) ABSTRACT

Disclosed herein is a solid-state image sensing device comprising a plurality of pixels. Each of the pixels comprises (1) a photodiode for generating an electric signal according to an amount of light projected thereto, (2) a converter capable of logarithmically converting the electric signal into a converted electric signal while a first voltage is biased, and (3) a switching element for electrically connecting and disconnecting the photoelectric converting element and the converter. The switching element electrically disconnects the photodiode and the converter while outputting an electric signal for correcting a sensitivity unevenness among the plurality of pixels. The converting element is temporarily biased by a second voltage before taking the image, the second voltage being suitable for discharging an electric charge from the photodiode and being different from the first voltage.

19 Claims, 8 Drawing Sheets

SOLID-STATE IMAGE SENSING DEVICE

CROSS-REFERENCE TO RELATED ART

This application is based on Japanese Patent Application No. 2001-362420 filed in Japan on Nov. 28, 2001, the entire content of which is hereby incorporated by reference.

BACKGROUND OF THE INVENTION

1. Field of the Invention

The present invention relates to a solid-state image sensing device having photoelectric converting means for outputting a signal proportional to a logarithm value of an amount of incident light.

2. Description of the Related Art

A solid-state image sensing device is small, light weight and of low-power consumption. Moreover, image distortion and burning do not occur in the device, and the device is strong in environmental conditions such as vibration and magnetic field. Further, since the device can be manufactured by the step which is common with or similar to that of LSI (Large Scale Integrated Circuit), its reliability is high and it is suitable to mass production. For this reason, a solid-state image sensing device where pixels are arranged linearly is used widely for a facsimile and a flat bed scanner, and a solid-state image sensing device where pixels are arranged in a matrix pattern is used widely for a video camera and a digital camera. Such solid-state image sensing devices are roughly classified into CCD type and MOS type devices according to means for reading (taking out) photoelectric charges generated from a photoelectric converting element. A CCD type device stores photoelectric charges in a potential well and simultaneously transmits them, thus arising a disadvantage that a dynamic range is narrow. On the other hand, an MOS type device reads electric charges stored in a pn junction capacitance of a photodiode via an MOS transistor.

As a technique for widening a dynamic range of an MOS type solid-state image sensing device, U.S. Pat. No. 5,241,575 which is assigned to the alienee of this patent application is known. The U.S. Pat. No. 5,241,575 suggests a solid-state image sensing device which includes photocurrent generating means for generating a photocurrent according to an amount of incident light, an MOS transistor for inputting a photocurrent, and bias means for biasing the MOS transistor so that a sub-threshold current flows in the MOS transistor. In this device, a photocurrent is logarithmically converted.

Although such a solid-state image sensing device has a wide dynamic range, threshold properties of the MOS transistors provided for respective pixels are different from one another, thereby occasionally making sensitivity different per pixel. Therefore, it is necessary to hold an output obtained by previously emitting a bright light (uniform light) with uniform brightness as correcting data for correcting outputs of respective pixels at the time of taking an image of an object.

However, there arises problems such that it is complicated for an operator to irradiate the respective pixels using an external light source and exposure cannot be executed uniformly and effectively. Moreover, when an uniform light emitting mechanism is provided to an image sensing device, there arises a problem that the structure of the image sensing device becomes complicated. Therefore, as a technique which solves this problem, Japanese Patent Application Laid-Open No. 2001-094878 which is assigned to the alienee of this patent application is known. This Japanese patent publication suggests a solid-state image sensing device which is capable of counteracting sensitivity unevenness of the respective pixels without previously emitting an uniform light.

FIG. 1 shows a structure of pixel provided to the solid-state image sensing device disclosed in this Japanese patent publication. In the pixels in FIG. 1, a pn photodiode PD forms a photosensitive section (photoelectric converting section). An anode of the photodiode PD is connected with a drain of an MOS transistor T1, and a source of the MOS transistor T1 is connected with a drain and a gate of an MOS transistor T2 and a gate of an MOS transistor T3. A source of the MOS transistor T3 is connected with a drain of an MOS transistor T4 for selecting lines. A source of the MOS transistor T4 is connected with an output signal line 6. Here, the MOS transistors T1 through T4 are N-channel MOS transistors, respectively, and are grounded with back gate.

In addition, a DC voltage VPD is applied to a cathode of the photodiode PD and a drain of the MOS transistor T3. On the other hand, a signal φVPS is input into a source of the MOS transistor T2. Moreover, a signal φS is input into a gate of the MOS transistor T1, and a signal φV is input into a gate of the MOS transistor T4.

Respective signals are given to the pixels having such a structure according to a timing chart shown in FIG. 15. Namely, the signal φS is brought into high level so that the MOS transistor T1 is turned ON, and the signal φVPS is brought into high level and a bias voltage to be applied to the MOS transistor T2 is set so that the MOS transistor T2 is operated in a sub-threshold region. Thereafter, a pulse signal φV is given thereto so that a signal at the time of image sensing is output as image data.

The signal φS is brought into low level so that the MOS transistor T1 is turned OFF. The signal φVPS is brought into low level so that a bias voltage to be given to the MOS transistor T2 is different from that at the time of image sensing, thereby resetting the MOS transistor T2. Thereafter, the signal φVPS is brought into high level. The pulse signal φV is given in this state, so that a signal which reflects a threshold voltage of the MOS transistor T2 is output. This signal represents a sensitivity unevenness between the pixels and is used as correcting data for correcting sensitivity unevenness. Thereafter, the signal φS is brought into high level so that an image sensing operation is performed. Image data obtained in such a manner are corrected by the correcting data so that the sensitivity unevenness between the pixels can be canceled.

However, in the solid-state image sensing device having the function for canceling sensitivity unevenness, it is found that there is a fear of after-image phenomenon. According to examination by the inventors, it is supposed that this phenomenon occurs due to the following reasons.

When the solid-state image sensing device having the function for canceling sensitivity unevenness performs the reset operation as mentioned above, the MOS transistor T1 is turned OFF so that electric connection between the anode of the photodiode PD and the drain of the MOS transistor T2 is cut. Therefore, the MOS transistor T2 is reset, but electric charges stored in the drain of the MOS transistor T1 and the anode of the photodiode PD remain. Since the image sensing operation is performed in the state that electric charges remain, it is considered that the after-image phenomenon occurs. The after-image phenomenon occurs remarkably at the time of low brightness.

SUMMARY OF THE INVENTION

In view of such a problem, it is an object of the present invention to provide a solid-state image sensing device which is capable of preventing sensitivity unevenness of each pixel and simultaneously preventing an after-image phenomenon.

To achieve the above mentioned object, a solid-state image sensing device reflecting one aspect of the present invention comprises a plurality of pixels each of which comprises (1) a photoelectric converting element for generating an electric signal according to an amount of light projected thereto, (2) a converter capable of logarithmically converting the electric signal into a converted electric signal while a first predetermined voltage is biased, and (3) a switching element, provided between the photoelectric converting element and said converter, for electrically connecting and disconnecting the photoelectric converting element and the converter. The switching element electrically disconnects the photoelectric converting element and the converter while outputting an electric signal for correcting a sensitivity unevenness among the plurality of pixels. The converting element is temporarily biased by a second predetermined voltage before taking the image, the second predetermined voltage being suitable for discharging an electric charge from the photoelectric converting element and being different from the first predetermined voltage.

Namely, after a characteristic of the converter which causes sensitivity unevenness is detected in a state that the switching element is OFF and the converter is reset, the switching element is turned ON. In such a state that the logarithmic converting section and the photoelectric element are electrically connected, a bias voltage to be applied to the converter is changed into a second predetermined voltage, thereby performing a discharging operation for resetting the converter and the photoelectric converting element. As a result, residual electric charges stored in the photoelectric converting element or the like are discharged, thereby suppressing an after-image phenomenon.

BRIEF DESCRIPTION OF DRAWINGS

These and other objects, advantages and features of the invention will become apparent from the following description thereof taken in conjunction with the accompanying drawings in which.

DETAILED DESCRIPTION OF THE PREFERRED EMBODIMENTS

<Structure of the Solid-State Image Sensing Device>

Figure 2:
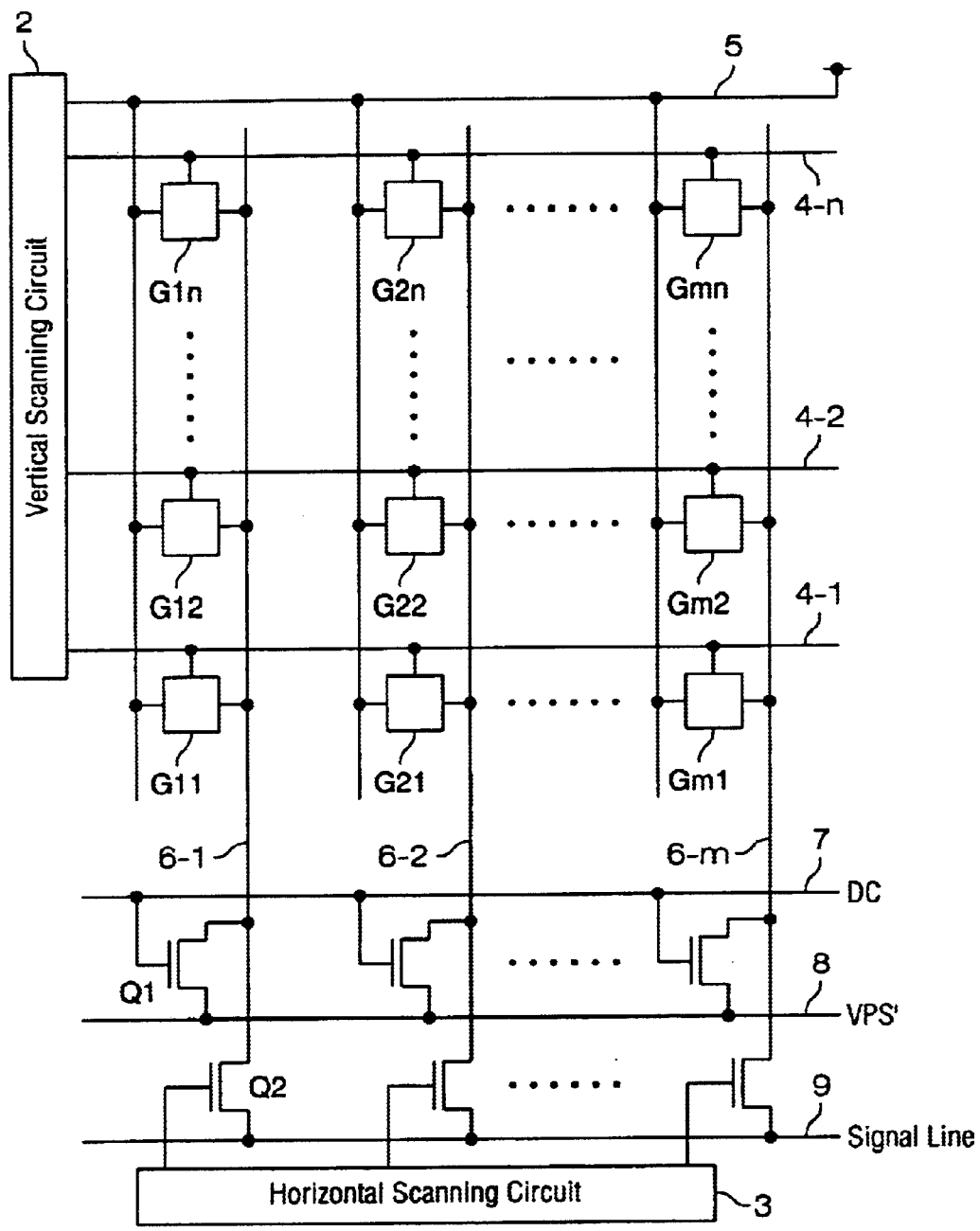
FIG. 2 is a block circuit diagram showing a structure of the solid-state image sensing device.

There will be explained below a solid-state image sensing device according to each embodiments of the present invention with reference to drawings. FIG. 2 schematically shows a two-dimensional structure of a part of an MOS type solid-state image sensing device of the present invention. In the drawing, G11 to Gmn show pixels arranged in a matrix pattern. 2 is a vertical scanning circuit and it scans lines 4-1, 4-2, ..., 4-n successively. 3 is a horizontal scanning circuit and it successively reads photoelectric converting signals led from the pixels to output signal lines 6-1, 6-2, ..., 6-m per pixel in a horizontal direction. 5 is a power source line. Not only the lines 4-1, 4-2, ..., 4-n and the output signal lines 6-1, 6-2, ..., 6-m and the power source line 5 but also another lines (for example, a clock line, a bias supply line and the like) are connected with the pixels, but these lines are omitted in FIG. 2.

One set of N-channel MOS transistors Q1 and Q2 are provided to each of the output signal lines 6-1, 6-2, ..., 6-m as shown in the drawing. Description will be given taking the output signal line 6-1 for instance. A gate of the MOS transistor Q1 is connected with a DC voltage line 7, its drain is connected with the output signal line 6-1, and its source is connected with a line 8 of a DC voltage VPS'. On the other hand, a drain of the MOS transistor Q2 is connected with the output signal line 6-1, its source is connected with a final signal line 9, and its gate is connected with the horizontal scanning circuit 3.

Figure 3A:
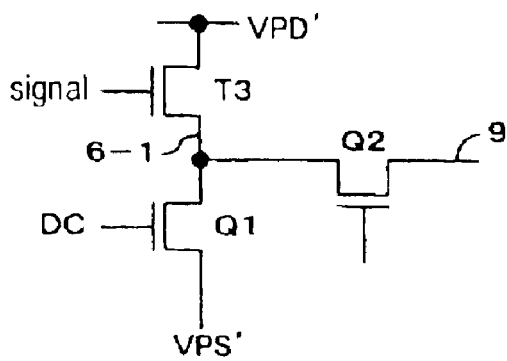
FIGS. 3(a) and 3(b) are diagrams each showing part of the solid-state image sensing device in FIG. 2.

An MOS transistor T3 for outputting a signal based on photoelectric charges generated on the pixels G11 through Gmn is provided to the pixels G11 through Gmn as mentioned later. A connecting relationship between the MOS transistor T3 and the MOS transistor Q1 is as shown in FIG. 3(a). Here, a relationship between a DC voltage VPS' connected with the source of the MOS transistor Q1 and a DC voltage VPD' connected with the drain of the MOS transistor T3 is that VPD'>VPS', and the DC voltage VPS' is a ground voltage (grounding), for example. In this circuit configuration, a signal is input into a gate of the upper MOS transistor T3, and a DC voltage DC is always applied to the gate of the lower MOS transistor Q1. For this reason, the lower MOS transistor Q1 is equivalent to resistance or a constant-current source, and the circuit in FIG. 3(a) is a source follower type amplifier. In this case, it may be considered that an electric current is amplified to be output from the MOS transistor T3.

Figure 3B:
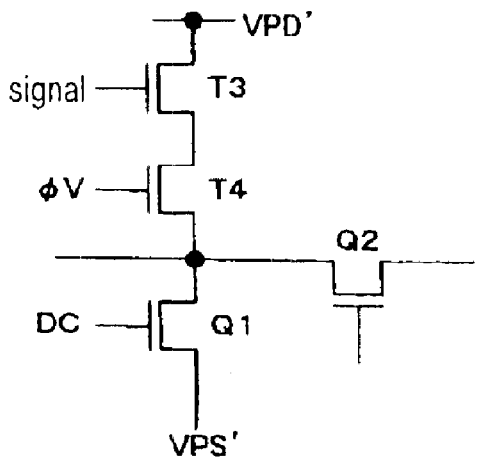

The MOS transistor Q2 is controlled by the horizontal scanning circuit 3 and operates as a switching element. Here as mentioned later, an MOS transistor T4 for switching is also provided into the pixels of the first and second embodiments. When the MOS transistor T4 is provided into the circuit configuration of FIG. 3(a), the circuit configuration is as shown in FIG. 3(b) accurately. Namely, the MOS transistor T4 is inserted between the MOS transistor Q1 and the MOS transistor T3. Here, the MOS transistor T4 selects a line, and the MOS transistor Q2 selects a row. The configurations shown in FIGS. 2 and 3 are common to the first and second embodiments, mentioned later.

With the configurations of FIGS. 3(a) and 3(b), a high signal can be output. Therefore, in the case where a pixel natural-logarithmically converts a photoelectric current which is generated from a photosensitive element in order to widen a dynamic range, an output signal is small in the original state, but the signal is amplified sufficiently large by an amplifier, thereby facilitating a process in a following signal processing circuit (not shown). Moreover, the MOS transistor Q1 composing a load resistance portion of the amplifier is not provided into the pixel but provided for each of the output signal lines 6-1, 6-2, ..., 6-m connected with plural pixels arranged in a row direction. As a result, a number of load resistors or constant-current sources can be reduced, thereby reducing an area of the amplifier occupying a semiconductor chip.

<First Embodiment>

There will be explained below a first embodiment applied to each pixel of the solid-state image sensing device shown in FIG. 2 with reference to the drawings. The structure of the pixels provided to the solid-state image sensing device used in the present embodiment is as shown in FIG. 1, and since this structure has been already explained, the overlapped explanation is omitted here.

Figure 1:
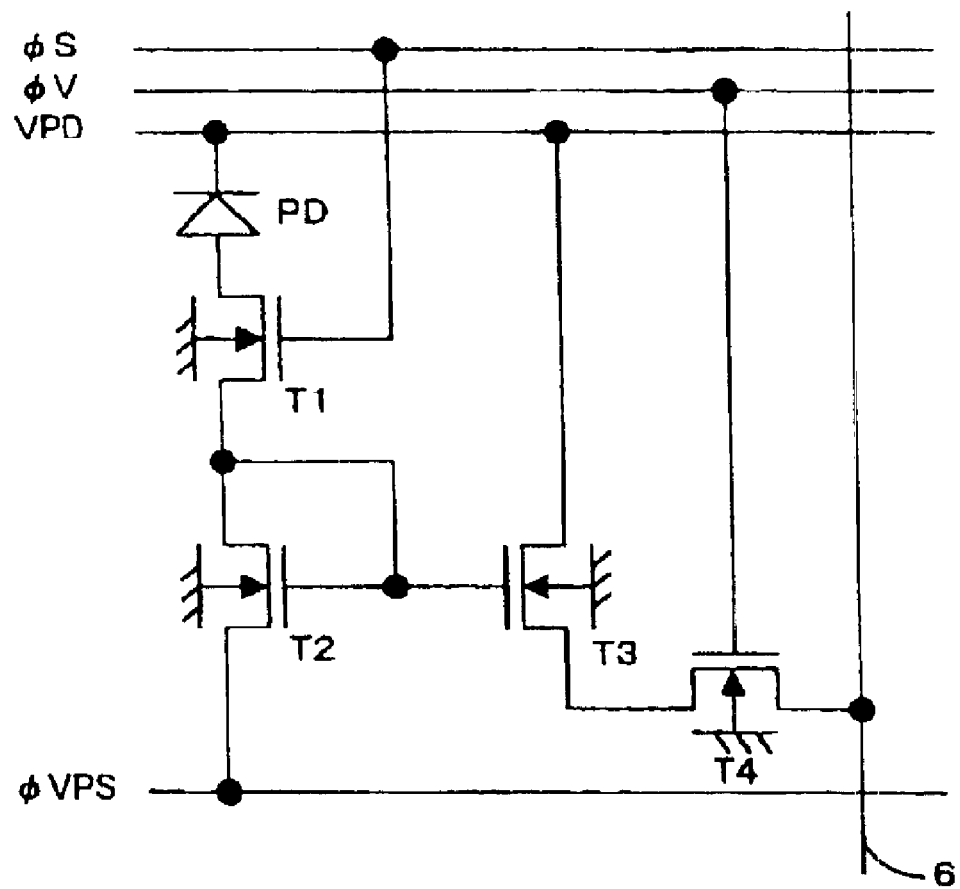
FIG. 1 is a circuit diagram showing one example of a structure of a pixel provided to a solid-state image sensing device.
Figure 4:
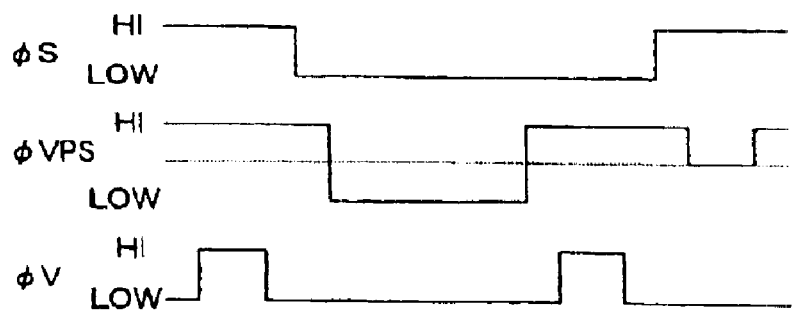
FIG. 4 is a timing chart showing an operation of each pixel in the solid-state image sensing device of a first embodiment.

The pixel arranged like FIG. 1 performs an image sensing operation and a reset operation according to the timing chart of FIG. 4. Here, a signal $\phi$VPS is a three-valued voltage signal. A voltage for operating the MOS transistor T2 in a sub-threshold region is in high level, and a voltage, which is lower than the former voltage and flows a larger electric current than that when a high voltage is applied to the MOS transistor T2, is in low level, and a voltage approximately in the middle of the high-level voltage and the low-level voltage is in intermediate level.

After a series of reset operation, mentioned later, is performed, a signal $\phi$S is brought into high level so that the MOS transistor T1 is turned ON, and simultaneously a signal $\phi$VPS is brought into high level so that the MOS transistor T2 is operated in the sub-threshold region. In such a state, when a light is allowed to enter the photodiode PD, a photoelectric current is generated according to an amount of the incident light. A voltage which is proportional to an amount of the incident light natural logarithmically is generated at the gates of the MOS transistors T2 and T3 to which a bias voltage is applied so as to be operated in the sub-threshold region.

At this time, a pulse signal $\phi$V is given to the gate of the MOS transistor T4, so that the MOS transistor T4 is-turned ON, and a drain current amplified by a gate voltage of the MOS transistor T3 flows as an output electric current to the output signal line 6 via the MOS transistors T3 and T4. The output electric current output to the output signal line 6 has a value proportional to a logarithmic value of an amount of the incident light. At this time, a drain voltage of the MOS transistor Q1, which is determined by resistance at the time of energizing of the MOS transistor T3 and the MOS transistor Q1 (FIG. 1) and electric currents flowing therein, appears as a signal in the output signal line 6. In such a manner, image data are output.

After the image data are output in such a manner, a signal $\phi$V is brought into low level so that the MOS transistor T4 is turned OFF, and a signal $\phi$S is brought into low level so that the MOS transistor T1 is turned OFF. The reset operation is then started. In the state that the MOS transistor T1 is OFF in such a manner, electric connection between the anode of the photodiode PD and the drain of the MOS transistor T2 is disconnected. At this time, negative electric charges flow from the source side of the MOS transistor T2, and positive electric charges stored in the gate of the MOS transistor T2 and the drain of the MOS transistor T3 are re-coupled.

Thereafter, the signal $\phi$VPS is brought into low level and a bias voltage to be given to the MOS transistor T2 is made to be different from that at the time of image sensing, thereby increasing an amount of negative electric charges which flow from the source of the MOS transistor T2. As a result, positive electric charges which are stored in the gate and the drain of the MOS transistor T2 and the gate of the MOS transistor T3 are re-coupled quickly. When the gate and the drain of the MOS transistor T2 and the gate of the MOS transistor T3 are reset in such a manner, the signal $\phi$VPS is brought into high level.

When the MOS transistor T4 is turned ON by giving the pulse signal $\phi$V, a drain electric current which is amplified by a gate voltage of the reset MOS transistor T3 is output as an output electric current to the output signal line 6 via the MOS transistors T3 and T4. A drain voltage of the MOS transistor Q1 which is determined by the output electric current output to the output signal line 6 appears as a signal in the output signal line 6. This signal reflects a threshold voltage of the MOS transistor T2, and this signal is obtained for each pixel, thereby detecting sensitivity unevenness of the pixels. The signal is used as correcting data for correcting sensitivity unevenness. In such a manner, the correcting data are output.

After the correcting data are output in such a manner, the signal $\phi$V is brought into low level so that the MOS transistor T4 is turned OFF, and the signal $\phi$S is brought into high level so that the MOS transistor T1 is turned ON. Thereafter, the signal $\phi$VPS is brought into intermediate level. As a result, residual electric charges, which are stored in the photodiode PD and between the photodiode PD and the drain of the MOS transistor T2, are re-coupled. When the photodiode PD and the MOS transistor T2 are reset in such a manner, the signal $\phi$VPS is brought into high level and the procedure prepares for a next image sensing operation.

After the MOS transistor T1 is turned OFF to be reset in such a manner, the MOS transistor T1 is turned ON and the signal $\phi$VPS to be given to the source of the MOS transistor T2 is brought into intermediate level, thereby canceling residual electric charges stored between the anode of the photodiode PD and the drain of the MOS transistor T2. Therefore, generation of an after-image is prevented and satisfactory image sensing becomes possible.

Here, when a voltage value which is intermediate level of the signal $\phi$VPS and is low and close to a low level voltage value, a potential of a gate lower region of the MOS transistor T2 becomes low. Therefore, in the case where an object has low brightness at this time, a sufficient light amount for operating the MOS transistor T2 in the sub-threshold region cannot be obtained, thereby easily deteriorating the sensitivity. On the contrary, when a voltage value which is an intermediate level of the signal φVPS is high and is close to a high level voltage value, there is a fear that the photodiode PD and the MOS transistors T1 and T2 are not reset sufficiently. Therefore, after correcting data relating to sensitivity unevenness of each pixel are output, it is preferable that a signal φVPS is set to intermediate level before staring the image sensing operation.

For comparison, in the case where the solid-state image sensing device having the pixel structure of FIG. 1 was operated by a conventional method and in the case where the device was operated by the method of the present embodiment, electric signals to be an after image were measured. At this time, after a light, surface illuminance of which in the solid-state image sensing device was 2194.5 Lx was emitted, image data, which were output after the emission of light was stopped and the image sensing operation for 3 frames was performed, were measured. The measured image data were compared with image data which were output when a light with surface illuminance of 2194.5 Lx was emitted, so that after image was measured.

Figure 5:
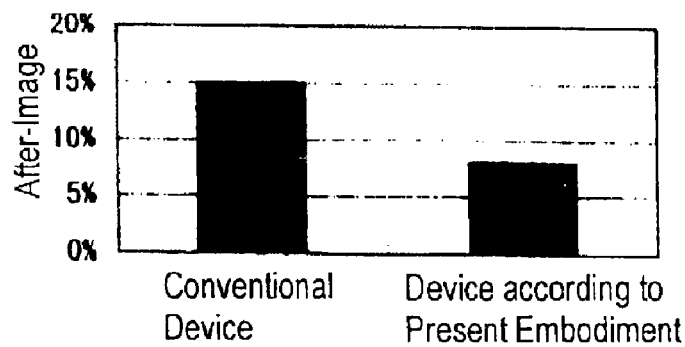
FIG. 5 is a graph showing an amount of signals to be output as after-images in a conventional solid-state image sensing device and in the solid-state image sensing device of the present embodiment.

When such a measurement is conducted, in the case of conventional method as shown in FIG. 5, an output which appears as an after image becomes 15% of that when a light is emitted, and in the case of the present embodiment, an output which appears as an after image becomes 8% of that when a light is emitted. Therefore, it is found that the output which appears as an after image is reduced in comparison with the conventional method.

<Second Embodiment>

Figure 6:
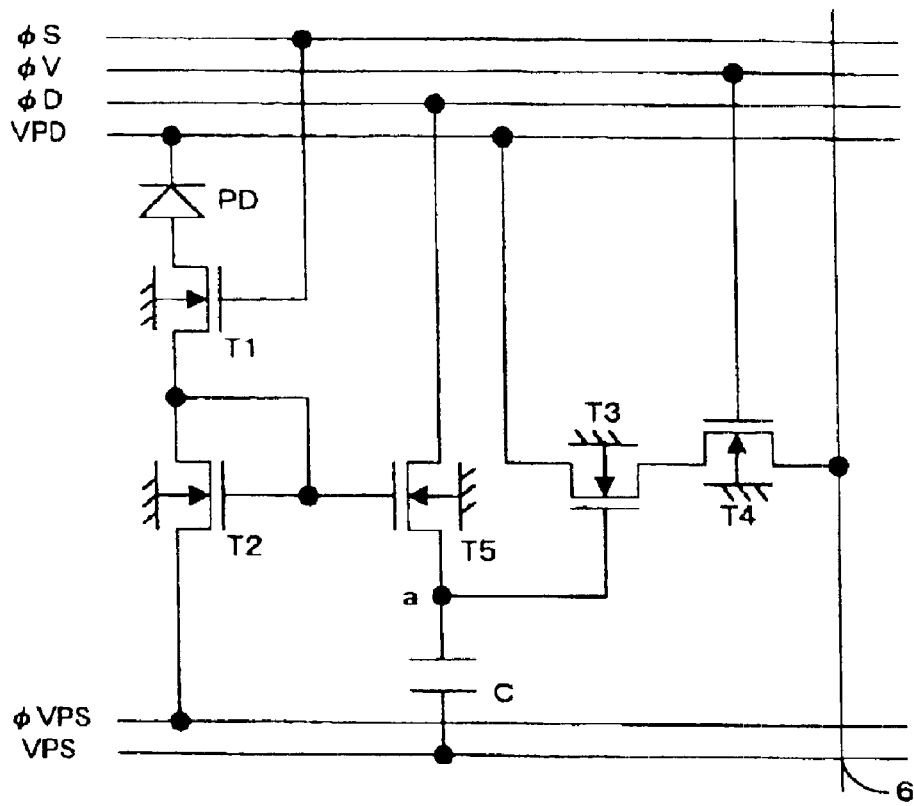
FIG. 6 is a circuit diagram showing one example of the structure of the pixel provided to the solid-state image sensing device.

There will be explained below a second embodiment applied to each pixel of the solid-state image sensing device shown in FIG. 2 with reference to the drawings. FIG. 6 is a circuit diagram showing a configuration of the pixel provided to the solid-state image sensing device in the present embodiment. Here in the pixel shown in FIG. 6, the similar parts in the pixel to FIG. 1 are designated by similar reference numerals, and detailed explanation thereof is omitted.

As shown in FIG. 6, the pixel of the present embodiment is arranged so that an MOS transistor T5 and a capacitor C are added to the pixel of the first embodiment (FIG. 1). A gate of the MOS transistor T5 is connected with a gate and a drain of the MOS transistor T2, and its source is connected with a gate of the MOS transistor T3. One end of the capacitor C is connected with a source of the MOS transistor T5, and a DC voltage VPS is applied to the other end. At this time, a signal φD is input into a drain of the MOS transistor T5. Here, the MOS transistor T5 is an N-channel MOS transistor and is grounded with a back gate similarly to the MOS transistors T1 through T4.

Figure 7:
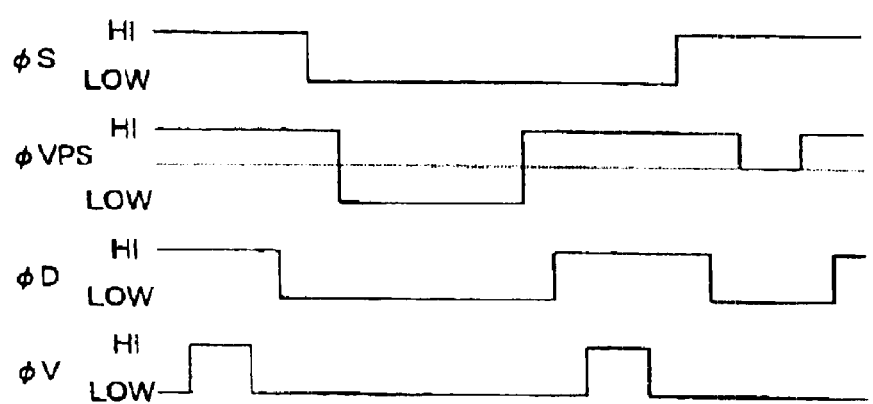
FIG. 7 is a timing chart showing an operation of each pixel in the solid-state image sensing device of a second embodiment.

The pixel having the structure of FIG. 6 performs the image sensing operation and the reset operation according to a timing chart of FIG. 7. After a series of the reset operation, mentioned later, is performed, a signal φS is brought into high level so that the MOS transistor T1 is turned ON, and a signal φVPS is brought into high level so that the MOS transistor T2 is operated in a sub-threshold region. Moreover, at this time, a signal φD is brought into high level (potential which is the same as a DC voltage VPD or close to a DC voltage VPD).

In this state, when a photoelectric current is generated from the photodiode PD, a voltage, which changes logarithmically with respect to an amount of incident light, appears at gates of the MOS transistors T2 and T5 due to sub-threshold properties of the MOS transistor T2. An electric current flows in the MOS transistor T5 due to this voltage, and electric charges, which are equivalent to a value obtained by converting an integral value of a photoelectric current logarithmically, are stored in the capacitor C. Namely, a voltage which is proportional to the value obtained by converting the integral value of the photoelectric current logarithmically is generated at a connecting node a between the capacitor C and the source of the MOS transistor T5. At this time, the MOS transistor T4 is in OFF state.

Next, when a pulse signal φV is given to the gate of the MOS transistor T4 so that the MOS transistor T4 is turned ON, an electric current which is proportional to a voltage to be applied to the gate of the MOS transistor T3 passes through the MOS transistors T3 and T4 to be led to the output signal line 6. Since a voltage applied to the gate of the MOS transistor T3 is now a voltage to be applied to the connecting node a, an electric current to be led to the output signal line 6 becomes a value obtained by converting an integral value of a photoelectric current logarithmically. In such a manner, a signal (output electric current) which is proportional to a logarithmic value of an amount of incident light can be read. Moreover, after the signal is read, a signal φV is brought into low level, so that the MOS transistor T4 is turned OFF.

After image data are output in such a manner, when the signal φV is brought into low level so that the MOS transistor T4 is turned OFF. The signal φD is brought into low level and electric charges stored in the capacitor C are discharged to a signal line to which the signal φD is given, so that a voltage of the connecting node a which is applied to the gate of the MOS transistor T3 is reset. Similarly to the first embodiment, the signal φS is brought into low level so that the MOS transistor T1 is turned OFF and the reset operation is started. As a result, negative electric charges flow from the source side of the MOS transistor T2, and positive electric charges stored in the gate and the drain of the MOS transistor T2 and the gate of the MOS transistor T5 are re-coupled.

Thereafter, the signal φVPS is brought into low level, thereby re-coupling positive electric charges stored at the gate and the drain of the MOS transistor T2 and the gate of the MOS transistor T5 soon. When the gate and the drain of the MOS transistor T2 and the gate of the MOS transistor T5 are reset in such a manner, the signal φVPS is brought into high level and the signal φD is brought into high level.

When the signal φD is brought into high level in such a manner, gate voltages of the reset MOS transistors T2 and T5 are amplified with electric current in the MOS transistor T5 so that electric charges according to a threshold voltage of the reset MOS transistor T2 are stored in the capacitor C. When the MOS transistor T4 is turned ON by applying the pulse signal φV, an electric current which is proportional to a voltage to be applied to the gate of the MOS transistor T3 passes through the MOS transistors T3 and T4 to be led to the output signal line 6. Correcting data are output by the output electric current let to the output signal line 6.

After the correcting data are output in such a manner, the signal φV is brought into low level so that the MOS transistor T4 is turned OFF. As a result, the signal φS is brought into high level so that the MOS transistor T1 is turned ON. After the signal φD is brought into low level again, the signal φVPS is brought into intermediate level. As a result, the capacitor C and the connecting node a are reset, and residual electric charges stored between the photodiode PD and the MOS transistor T2 are re-coupled. When the photodiode PD and the MOS transistor T2 are reset in such a manner, the signal φVPS is brought into high level and the signal φD is brought into high level, so that the device is prepared for a next image sensing operation.

After the MOS transistor T1 is turned OFF to be reset in such a manner, the MOS transistor T1 is turned ON and the signal φVPS to be given to the source of the MOS transistor T2 is brought into intermediate level, thereby canceling residual electric charges stored between the anode of the photodiode PD and the drain of the MOS transistor T2. Therefore, generation of an after image is prevented, thereby making satisfactory image sensing possible.

In the above-mentioned first and second embodiments, all the MOS transistors T1 through T5 which are active elements in the pixels are composed of N-channel MOS transistors, but all the MOS transistors T1 through T5 may be composed of P-channel MOS transistors. There will be explained below an embodiment in which the active elements composing the solid-state image sensing device are composed of P-channel MOS transistors.

<Structure of Solid-State Image Sensing Device>

Figure 8:
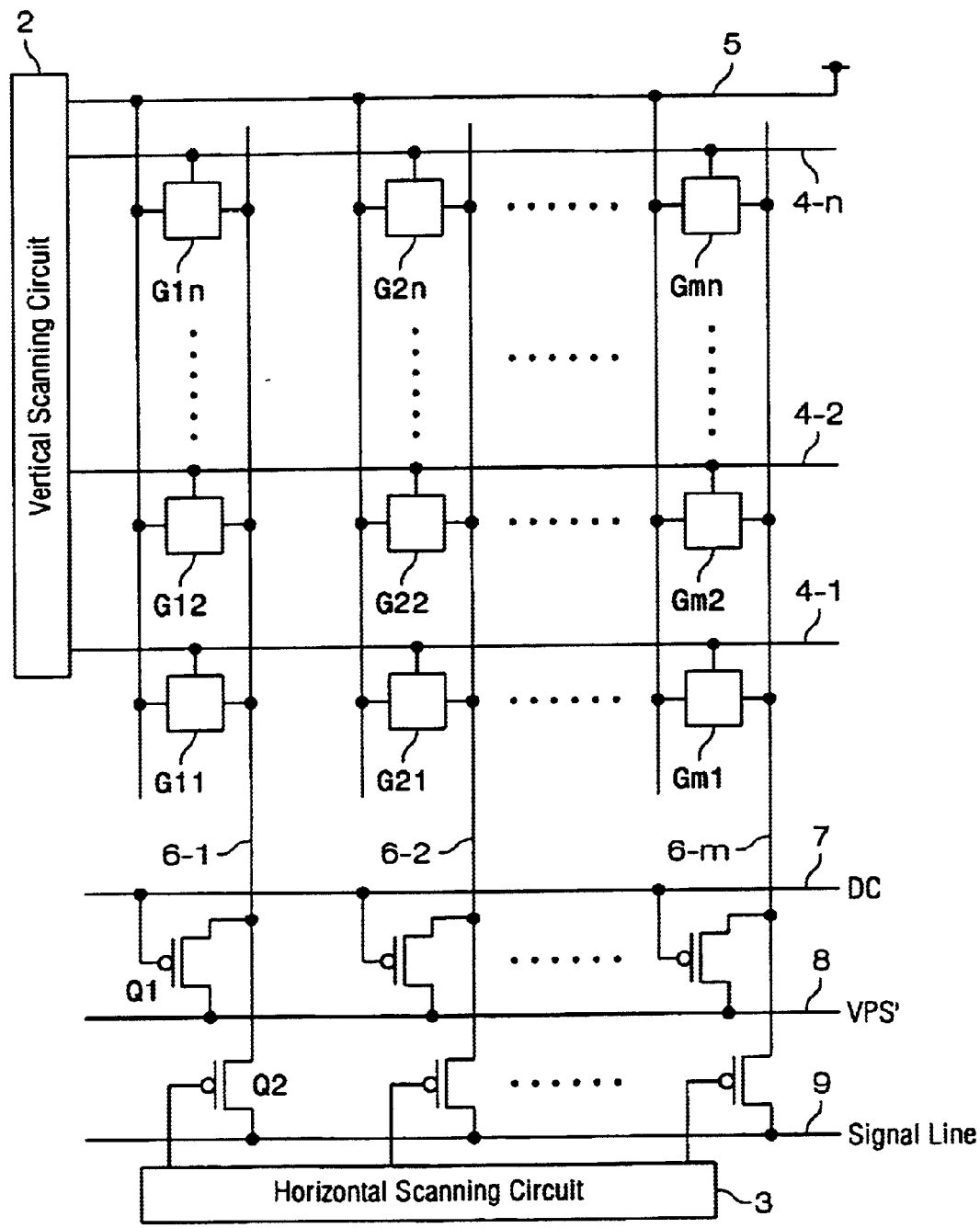
FIG. 8 is a block circuit diagram showing the structure of the solid-state image sensing device.

There will be simply explained below a structure of the solid-state image sensing device. FIG. 8 schematically shows a partial two-dimensional structure of a MOS type solid-state image sensing device of the present invention. Here, the similar parts to those of the solid-state image sensing device of FIG. 2 are designated by similar reference numerals, and detailed explanation thereof is omitted. In the solid-state image sensing device of FIG. 8, a P-channel MOS transistor Q1 and a P-channel MOS transistor Q2 are connected with output signal lines 6-1, 6-2, ..., 6-m which are arranged in a row direction. A gate of the MOS transistor Q1 is connected with a DC voltage line 7, and a drain is connected with the output signal line 6-1, and a source is connected with a line 8 of a DC voltage VPS'.

Meanwhile, the drain of the MOS transistor Q2 is connected with the output signal line 6-1, and the source is connected with the final signal line 9, and the gate is connected with the horizontal scanning circuit 3. Here, the MOS transistor Q1 as well as a P-channel MOS transistor T3 in pixels configures an amplifying circuit shown in FIG. 9(a). In this case, the MOS transistor Q1 is a load resistance or a constant-current source of the MOS transistor T3. Therefore, a relationship between a DC voltage VPS' to be connected with the source of the MOS transistor Q1 and a DC voltage VPD' to be connected with the drain of the MOS transistor T3 is that VPD'<VPS'. The DC voltage VPD' is, for example, ground voltage (grounding).

Figure 9A:
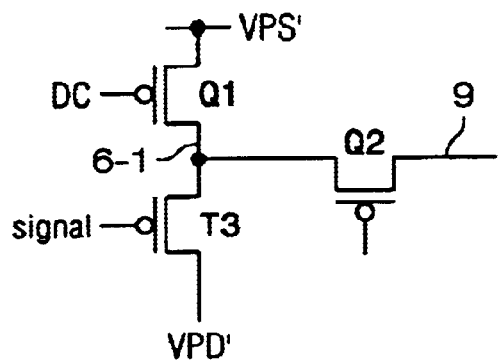
FIGS. 9(a) and 9(b) are diagrams each showing portion of the solid-state image sensing device in FIG. 8.
Figure 9B:
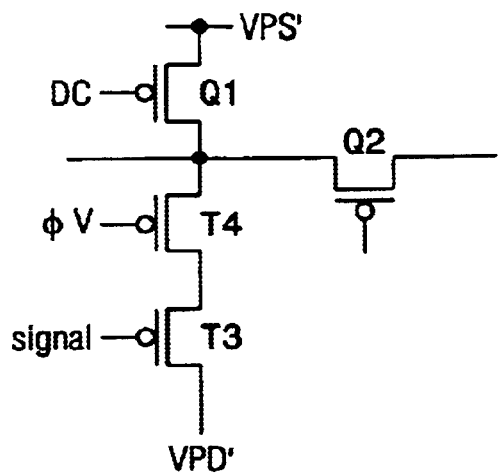

The drain of the MOS transistor Q1 is connected with the MOS transistor T3, and a DC voltage is applied to the gate. The P-channel MOS transistor Q2 is controlled by the horizontal scanning circuit 3, and an output of the amplifying circuit is led to the final signal line 9. When the MOS transistor T4 provided in the pixels is considered like the third and fourth embodiments, the circuit of FIG. 9(a) is represented like FIG. 9(b).

<Third Embodiment>

Figure 10:
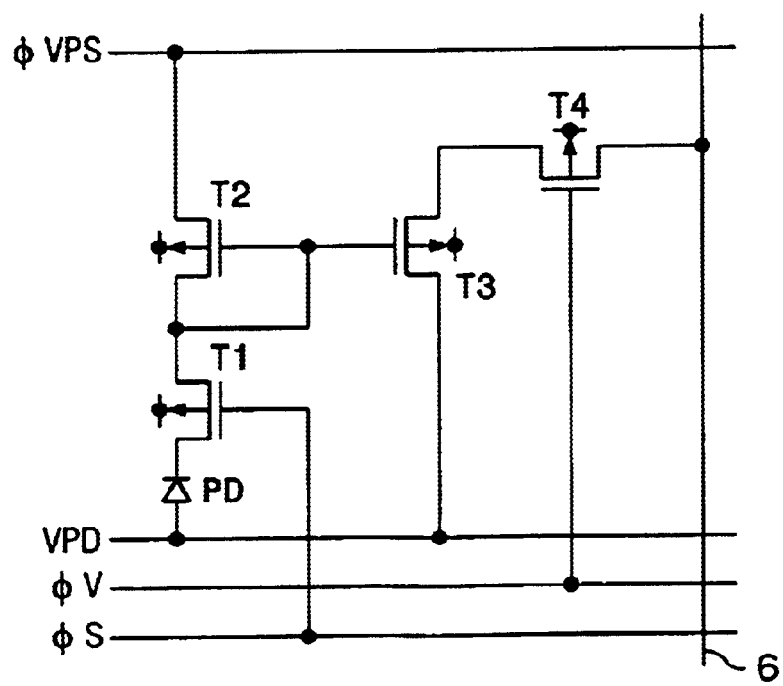
FIG. 10 is a circuit diagram showing one example of a structure of a pixel provided to the solid-state image sensing device.

There will be explained below a third embodiment to be applied to each pixel of the solid-state image sensing device shown in FIG. 8 with reference to the drawings. FIG. 10 is a circuit diagram showing a structure of the pixel provided to the solid-state image sensing device of the present embodiment. Here in the pixel shown in FIG. 10, the similar parts to those in the pixel o FIG. 1 are designate by similar reference numerals, detailed explanation thereof is omitted.

In the present embodiment, all the MOS transistors T1 through T4 are P-channel MOS transistors, and a DC voltage is applied to their back gate. Therefore, an anode the photodiode PD is connected with a DC voltage VPD, and its cathode is connected with the drain of the MOS transistor T1. Moreover, the source of the MOS transistor T1 is connected with the drain and the gate of the MOS transistor T2 and the gate of the MOS transistor T3. A signal φVPS is given to the source of the MOS transistor T2.

The DC voltage VPD is applied to the drain of the MOS transistor T3, and the source of the MOS transistor T3 is connected with the drain of the MOS transistor T4. The source of the MOS transistor T4 is connected with the output signal line 6. Moreover, a signal φV is given to the gate of the MOS transistor T4.

Figure 11:
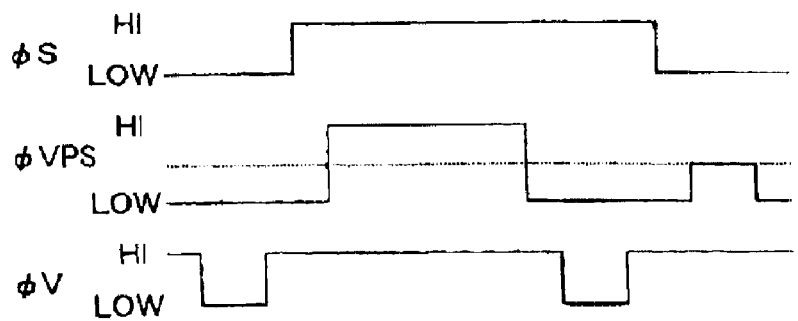
FIG. 11 is a timing chart showing an operation of each pixel in the solid-state image sensing device of a third embodiment.

The pixel having such a structure is operated according to a timing chart shown in FIG. 11. Respective signals in the timing chart of FIG. 11 are obtained by inverting signals in the timing chart shown in FIG. 4. Therefore, when the signals are in high level in FIG. 4, the signals are in low level in FIG. 11. Inverted signals φS, φV and φVPS are given at the similar timing to that in the first embodiment in such a manner, thereby performing the similar image sensing operation and resetting operation to those in the first embodiment.

<Fourth Embodiment>

Figure 12:
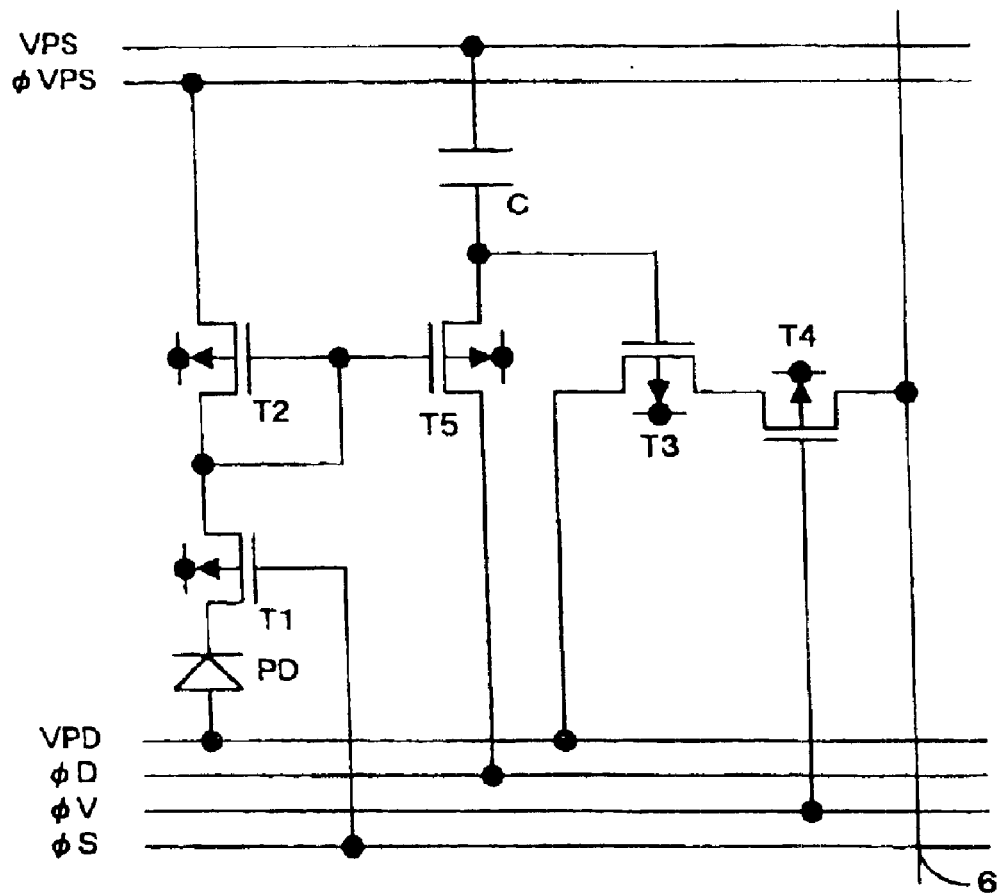
FIG. 12 is a circuit diagram showing one example of a structure of a pixel provided to the solid-state image sensing device.

There will be explained below a fourth embodiment to be applied to each pixel of the solid-state image sensing device sown in FIG. 8 with reference to the drawings. FIG. 12 is a circuit diagram showing a structure of the pixel provided to the solid-state image sensing device of the present embodiment.

As shown in FIG. 12, similarly to the third embodiment (FIG. 10), the structure of the pixel in the present embodiment is such that all MOS transistors T1 through T5 are P-channel MOS transistors in the structure of the pixel in the second embodiment (FIG. 6). Therefore, a connecting relationship in the present embodiment is similar to that of the third embodiment as for the photodiode PD and the MOS transistor T1, and the other connecting relationships are similar to those in the second embodiment.

Figure 13:
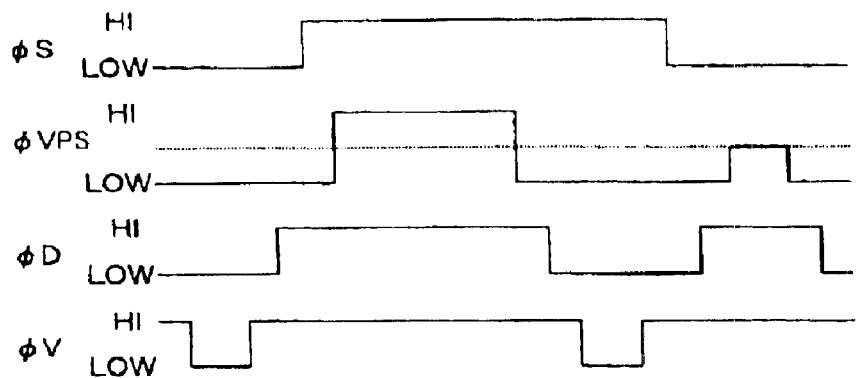
FIG. 13 is a timing chart showing an operation of each pixel in the solid-state image sensing device of a fourth embodiment.

As shown in a timing chart of FIG. 13, respective signals to be given to the pixels having such a structure are obtained by inverting the signals in the timing chart shown in FIG. 7. Therefore, when the signals are in high level in FIG. 7, the signals are in low level in FIG. 13. The inverted signals φS, φV, φVPS and φD are given at the similar timing to that in the second embodiment in such a manner, thereby performing the similar image sensing operation and resetting operation to those in the first embodiment.

In the above-explained first through fourth embodiments, signals may be read from the pixels by a charge-coupled device (CCD). In this case, a potential barrier which can change a potential level corresponding to the MOS transistor T4 is provided so that electric charges may be read to the CCD. Moreover, the pixel may adopt another structure such that an MOS transistor for resetting the capacitor C is provided for example in the second and fourth embodiments.

<Correcting Method of Image Data>

There will be explained below an embodiment in which the solid-state image sensing device where the pixels having the circuit configurations of the first through fourth embodiments is used for an image input device such as a digital camera with reference to the drawings.

Figure 14:
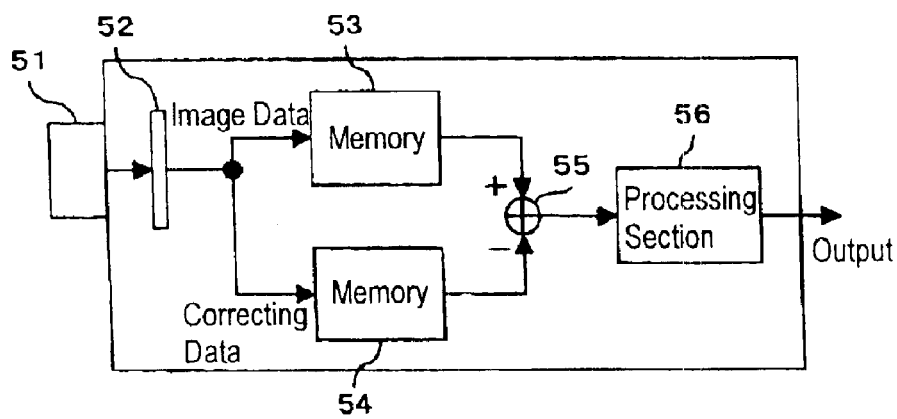
FIG. 14 is a block diagram showing an internal structure of an image input device provided with the solid-state image sensing device using the pixel according to the respective embodiments.
Figure 15:
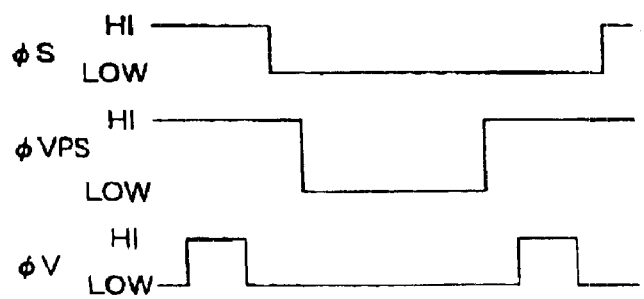
FIG. 15 is a timing chart showing an operation of each pixel in a conventional solid-state image sensing device.

The image input device shown in FIG. 14 has an objective lens 51, a solid-state image sensing device 52, a memory 53, a memory 54, a correction arithmetic circuit 55 and a processing section 56. The solid-state image sensing device 52 outputs an electric signal according to an amount of a light entering through the objective lens 51. The memory 53 inputs image data as the electric signal of the solid-state image sensing device 52 at the time of image sensing and temporarily stores them. The memory 54 inputs correcting data as an electric signal of the solid-state image sensing device 52 at the time of resetting and temporarily stores them. The correction arithmetic circuit 55 correctingly operates the correcting data stored from the memory 54 according to the image data sent from the memory 53. The processing section 56 operates the image data on which the correction has been executed by the correcting data in the correction arithmetic circuit 55 and outputs the operated image data to the outside. Here, the solid-state image sensing device 52 is a solid-state image sensing device which is provided with the pixels having the circuit configurations of the first through fourth embodiments.

The image input device having such a structure firstly performs the image sensing operation, and outputs image data for each pixel from the solid-state image sensing device 52 to the memory 53. When the respective pixels ends the image sensing operation and performs the resetting operation, as explained above, sensitivity unevenness of each pixel is checked, and the correcting data are output to the memory 54. The image data for each pixel in the memory 53 and the correcting data for each pixel in the memory 54 are transmitted to the correction arithmetic circuit 55. The image date is transmitted with each pixel.

The correction arithmetic circuit 55 correctingly operates the correcting data, which are transmitted from the memory 54 on the pixel outputting the image data, for each pixel according to the image data transmitted from the memory 53. After the correctingly operated image data are transmitted to the processing section 56 and are operated, the data are output to the outside. Moreover, in such an image input device, as the memories 53 and 54, line memories or the like, in which data which are transmitted for each line from the solid-state image sensing device 52 are recorded, are used. Therefore, it is easy to install the memories 53 and 54 into the solid-state image sensing device.

In another embodiment, reset is executed, thereby approximately canceling the sensitivity unevenness of each pixel. However, in order to execute the resetting accurately, a correcting circuit which includes a memory, a correction arithmetic circuit and the like explained in FIG. 14 may be provided.

According to the solid-state image sensing device in the above embodiments, in the state that a switch (MOS transistor T1) is turned ON and a logarithmic converting section is electrically connected with a photosensitive element, a bias voltage of the logarithmic converting section is changed, thereby discharging residual electric charges at the time of image sensing stored in the photosensitive element. Therefore, since electric charges which remain in a photosensitive element or the like can be discharged even if resetting like the conventional arts, the after-image phenomenon can be reduced.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A solid-state image sensing device comprising a plurality of pixels for taking an image, each of said pixels comprising:

a photoelectric converting element for generating an electric signal according to an amount of light projected thereto;

a converter capable of logarithmically converting the electric signal into a converted electric signal while a first predetermined voltage is biased; and a switching element, provided between said photoelectric converting element and said converter, for electrically connecting and disconnecting said photoelectric converting element and said converter, wherein each of said switching elements electrically disconnects a respective one of said photoelectric converting elements and a respective one of said converters while outputting an electric signal for correcting a sensitivity unevenness among the plurality of pixels from a respective one of said pixels, and wherein each of said converting elements is temporarily biased by a second predetermined voltage before taking the image, the second predetermined voltage being suitable for discharging an electric charge from a respective one of said photoelectric converting elements and being different from the first predetermined voltage.

2. A solid-state image sensing device as claimed in claim 1, wherein each of said converters comprises a MOS transistor to which the first and second voltages are biased.

3. A solid-state image sensing device as claimed in claim 1, wherein each of said converting elements temporarily biased by a third predetermined voltage and said each of switching elements electrically disconnects the respective one of said photoelectric converting elements and the respective one of said converter while outputting the electric signal for correcting the sensitivity unevenness among the plurality of pixels from the respective one of said pixels, the third voltage being different from the first voltage.

4. A solid-state image sensing device for taking an image, said solid-image sensing device comprising:

a plurality of pixels each of which comprises:

a photoelectric converting element for generating an electric signal according to an amount of light projected thereto;

a converter capable of logarithmically converting the electric signal into a converted electric signal while a first voltage is biased; and a switching element, provided between said photoelectric converting element and said converter, for electrically connecting and disconnecting said photoelectric converting element and said converter; and a controller for controlling said switching elements and voltages biased to said converters so as to the following procedures (1) through (3) are carried out for each pixel:

(1) while outputting the converted electric signal, electrically connecting a respective one of said photoelectric converting elements and a respective one of said converter, and biasing a respective one of said converter with the first voltage;

(2) while outputting an electric signal for correcting a sensitivity unevenness among the plurality of pixels, electrically disconnecting the respective one of said photoelectric converting elements and the respective one of said converter, and (3) at a timing that is after the procedure (2) and before the procedure (1), temporarily biasing the respective one of said converting elements with a second predetermined voltage, the second predetermined voltage being suitable for discharging an electric charge from a respective one of said photoelectric converting elements and being different from the first predetermined voltage.

5. A solid-state image sensing device as claimed in claim 4, wherein each of said converters comprises a MOS transistor to which the first and second voltages are biased.

6. A solid-state image sensing device as claimed in claim 4, wherein in the procedure (2), said controller temporarily biases with a third predetermined voltage, the third voltage being different from the first voltage.

7. A solid-state image sensing device as claimed in claim 6, wherein the second voltage is different from the third voltage.

8. A solid-state image sensing device as claimed in claim 6, wherein the second voltage is an intermediate of the first and third voltages.

9. A solid-state image sensing device as claimed in claim 4, further comprising a processing circuit for subtracting the electric signals for correcting the sensitivity unevenness from the converted electric signals, respectively.

10. A solid-state image sensing device comprising a plurality of pixels for taking an image, each of said pixels comprising:

a photoelectric converting element for generating an electric signal according to an amount of light projected thereto;

a first MOS transistor of which a first electrode is capable of connected with said photoelectric converting element, said first MOS transistor being capable of operating sub-threshold region to logarithmically converting the electric signal by being biased with a first voltage; and a second MOS transistor for electrically connecting and disconnecting said photoelectric converting element and said first electrode of said first MOS transistor, said second MOS transistor having a control electrode for receiving a control signal controlling a switching operation thereof, wherein each of said switching MOS transistors receives a first control signal for electrically disconnecting a respective one of said photoelectric converting elements and said first electrode of a respective one of said first MOS transistors while outputting an electric signal for correcting a sensitivity unevenness among the plurality of pixels from a respective one of said pixels, and wherein, before taking the image, each of said switching MOS transistors receives a second control signal for electrically connecting the respective one of said photoelectric converting elements and said first electrode of a respective one of said first MOS transistors, and each of said first MOS transistors temporarily biased by a second predetermined voltage, the second predetermined voltage being suitable for discharging an electric charge from a respective one of said photoelectric converting elements and being different from the first predetermined voltage.

11. A solid-state image sensing device as claimed in claim 10, wherein each of the first MOS transistors further comprises a second electrode to which the first and second voltages are applied.

12. A solid-state image sensing device as claimed in claim 10, wherein each of said first MOS transistors further comprises a control electrode, and wherein said first and control electrodes of each of said first MOS transistors are capable of being connected with said first electrode of the respective one of said photoelectric converting element through the respective one of said second MOS transistors.

13. A solid-state image sensing device as claimed in claim 10, wherein each of said pixels further comprises an amplifier for amplifying the respective one of the converted electric signal and the respective one of the electric signals for correcting the sensitivity unevenness.

14. A solid-state image sensing device as claimed in claim 10, wherein each of said pixels further comprises a switching element for outputting the respective one of the converted electric signal and the respective one of the electric signals for correcting the sensitivity unevenness to an external output signal line.

15. A solid-state image sensing device as claimed in claim 10, wherein each of said pixels further comprises a capacitor for charging signal charges of the respective one of the converted electric signal and the respective one of the electric signals for correcting the sensitivity unevenness.

16. A solid-state image sensing device as claimed in claim 15, wherein each of said pixels further comprises a third MOS transistor of which a control electrode is connected with the first and control electrodes of the first MOS transistor and a first electrode is connected with one of terminals of said capacitor.

17. A solid-state image sensing device as claimed in claim 10, wherein said first MOS transistor consists of an N channel MOS transistor.

18. A solid-state image sensing device as claimed in claim 10, wherein said first MOS transistor consists of a P channel MOS transistor.

19. A solid-state image sensing device as claimed in claim 10, further comprising a controller for applying the first and second control signals and the first and second predetermined voltages to each of said first and second MOS transistors.

* * * * *

UNITED STATES PATENT AND TRADEMARK OFFICE
CERTIFICATE OF CORRECTION

| | | |
|---|---|---|
| PATENT NO. | : 6,867,409 B2 | |
| APPLICATION NO. | : 10/302300 | |
| DATED | : March 15, 2005 | |
| INVENTOR(S) | : Masayuki Kusuda and Tomokazu Kakumoto | |

It is certified that error appears in the above-identified patent and that said Letters Patent is hereby corrected as shown below:

<u>Column 12</u>

Line 25-27, delete claim 2.

Line 28-36, delete claim 3.

<u>Column 12,</u>

Line 25, insert claim --2. A solid-state image sensing device as claimed in claim 1, wherein each of said converters comprises a MOS transistor to which the first and second voltages are biased.--

Line 28, insert claim --3. A solid-state image sensing device as claimed in claim 1, wherein each of said converting elements temporarily biased by a third predetermined voltage and said each of switching elements electrically disconnects the respective one of said photoelectric converting elements and the respective one of said converter while outputting the electric signal for correcting the sensitivity unevenness among the plurality of pixels from the respective one of said pixels, the third voltage being different from the first voltage.--

Signed and Sealed this

Twenty-ninth Day of August, 2006

JON W. DUDAS
*Director of the United States Patent and Trademark Office*